(12) United States Patent
Park

(10) Patent No.: US 7,856,254 B2
(45) Date of Patent: Dec. 21, 2010

(54) MOBILE COMMUNICATION TERMINAL AND METHOD OF CONTROLLING THE SAME

(75) Inventor: Jun Serk Park, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 11/735,368

(22) Filed: Apr. 13, 2007

(65) Prior Publication Data

US 2008/0020810 A1 Jan. 24, 2008

(30) Foreign Application Priority Data

Jun. 5, 2006 (KR) .................. 10-2006-0050432
Jun. 21, 2006 (KR) .................. 10-2006-0056024

(51) Int. Cl.
*H04M 1/00* (2006.01)
*H04B 1/38* (2006.01)

(52) U.S. Cl. .................. 455/575.1; 455/566; 455/418

(58) Field of Classification Search ... 455/575.1–575.4, 455/550.1, 571.5, 566, 418; 345/184; 715/781–784
See application file for complete search history.

(56) References Cited

U.S. PATENT DOCUMENTS

| 6,332,024 | B1 | 12/2001 | Inoue et al. |
| 6,546,231 | B1 * | 4/2003 | Someya et al. ........... 455/550.1 |
| 6,803,930 | B1 * | 10/2004 | Simonson ................... 715/784 |
| 2002/0016187 | A1 * | 2/2002 | Hirayama et al. ........... 455/566 |
| 2003/0020696 | A1 * | 1/2003 | Horsley ...................... 345/184 |
| 2003/0043114 | A1 | 3/2003 | Silfverberg et al. |
| 2003/0119562 | A1 | 6/2003 | Kokubo |
| 2004/0222979 | A1 * | 11/2004 | Knighton ..................... 345/184 |
| 2006/0271878 | A1 * | 11/2006 | Hashimoto .................. 715/781 |
| 2007/0123320 | A1 * | 5/2007 | Han et al. ................. 455/575.1 |
| 2007/0264976 | A1 * | 11/2007 | Lessing et al. ........... 455/414.1 |

FOREIGN PATENT DOCUMENTS

| CN | 1292898 A | 4/2001 |
| CN | 1549998 A | 11/2004 |
| EP | 1 004 957 A1 | 5/2000 |
| WO | WO-02/21237 A2 | 3/2002 |
| WO | WO-03/021568 A1 | 3/2003 |

* cited by examiner

*Primary Examiner*—Lester Kincaid
*Assistant Examiner*—Daniel Lai
(74) *Attorney, Agent, or Firm*—Birch, Stewart, Kolasch & Birch, LLP

(57) ABSTRACT

A mobile communication terminal including a first rotary key configured to generate a first signal when the first rotary key is rotated, in which the first signal indicates a direction and an amount the first rotary key is rotated, a second rotary key configured to generate a second signal when the second rotary key is rotated, in which the second signal indicates a direction and an amount the first rotary key is rotated, a display unit configured to display a screen thereon, and a controller configured to control a specific operation on the displayed screen based on the first and second signals.

8 Claims, 12 Drawing Sheets

MOBILE COMMUNICATION TERMINAL AND METHOD OF CONTROLLING THE SAME

CROSS-REFERENCE TO RELATED APPLICATIONS

This application claims priority to Korean Application No. 2006-50432, filed on Jun. 5, 2006 and No. 2006-56024, filed on Jun. 21, 2006 in the Korean Intellectual Property Office, the disclosures of which are incorporated herein by reference.

BACKGROUND OF THE INVENTION

1. Field of the Invention

The present invention to a mobile terminal including at least one rotary key used to control displayed screens and a corresponding control method.

2. Description of the Related Art

Mobile terminals provide a variety of supplementary service functions in addition to basic call functions. For example, mobile terminals allow a user to send and receive text messages using a Short Message Service (SMS), access the Internet, play music or movies, etc. However, because the mobile terminal is small in size, the amount of space available for a display and input device is limited.

Therefore, to efficiently use the limited space, the mobile terminal is provided with a variety of function keys, a navigation key, etc. However, these keys are generally only used as up and down direction keys, a menu selection key, etc.

SUMMARY OF THE INVENTION

Accordingly, an object of the present invention is to address the above-noted and other problems.

Another object of the present invention is to provide a mobile communication terminal and corresponding method for controlling a variety of display screens using at least one rotary key.

To achieve these and other advantages and in accordance with the purpose of the present invention, as embodied and broadly described herein, the present invention provides in one aspect a mobile communication terminal including a first rotary key configured to generate a first signal when the first rotary key is rotated, in which the first signal indicates a direction and an amount the first rotary key is rotated. Also included is a second rotary key configured to generate a second signal when the second rotary key is rotated, in which the second signal indicates a direction and an amount the second rotary key is rotated. The terminal also includes a display unit configured to display a screen thereon, and a controller configured to control a specific operation on the displayed screen based on the first and second signals. The present invention also provides a corresponding method for controlling the mobile terminal.

In another aspect, the present invention provides a mobile communication terminal including an input device comprising a roller configured to be rotated to generate a first signal and configured to be pressed and rotated to generate a second signal, a display unit configured to display a screen thereon, and a controller configured to control a specific operation on the displayed screen based on the first and second signals. The present invention also provides a corresponding method for controlling the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
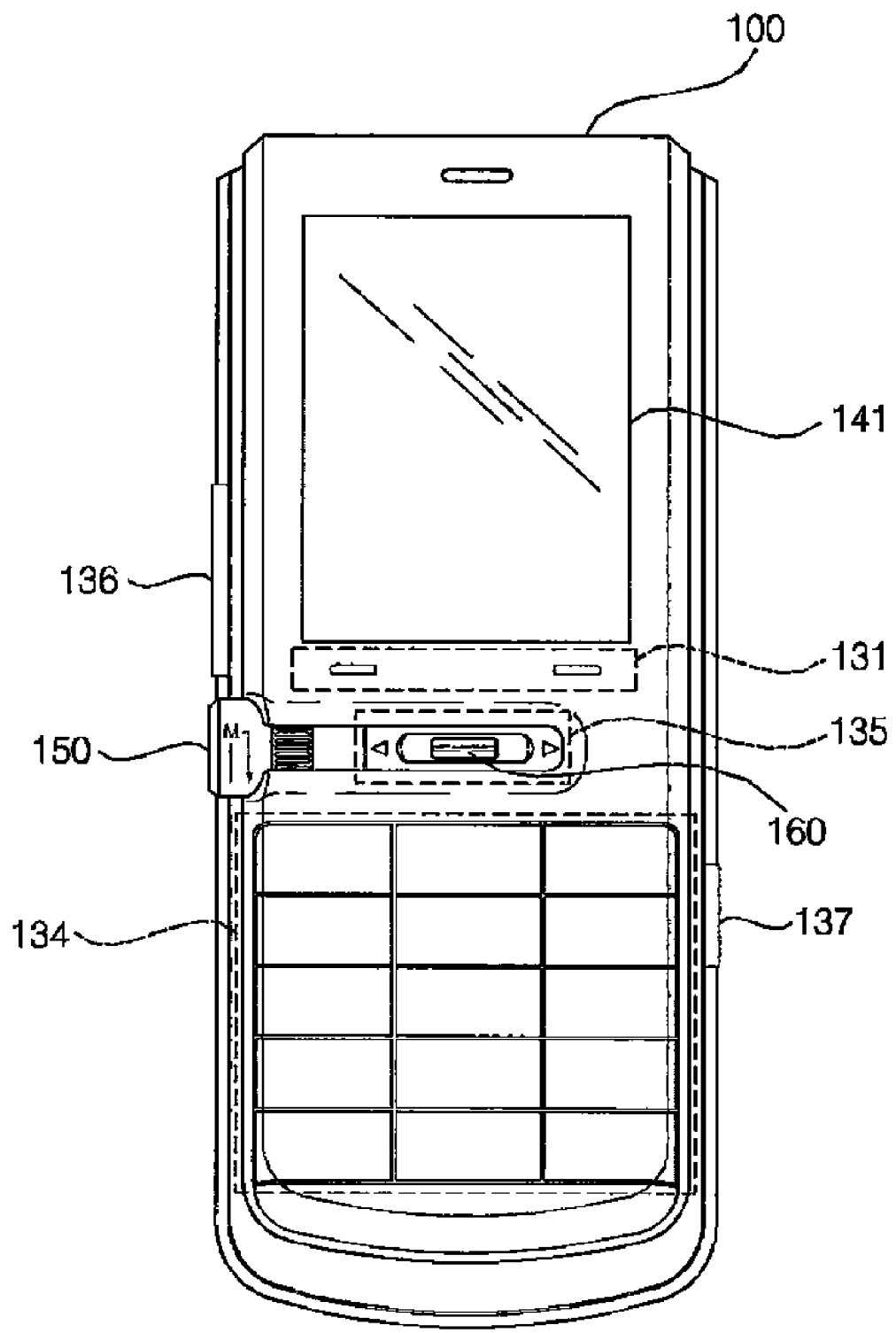
FIGS. 1 and 2 are overviews illustrating a mobile communication terminal according to an embodiment of the present invention.
Figure 2:
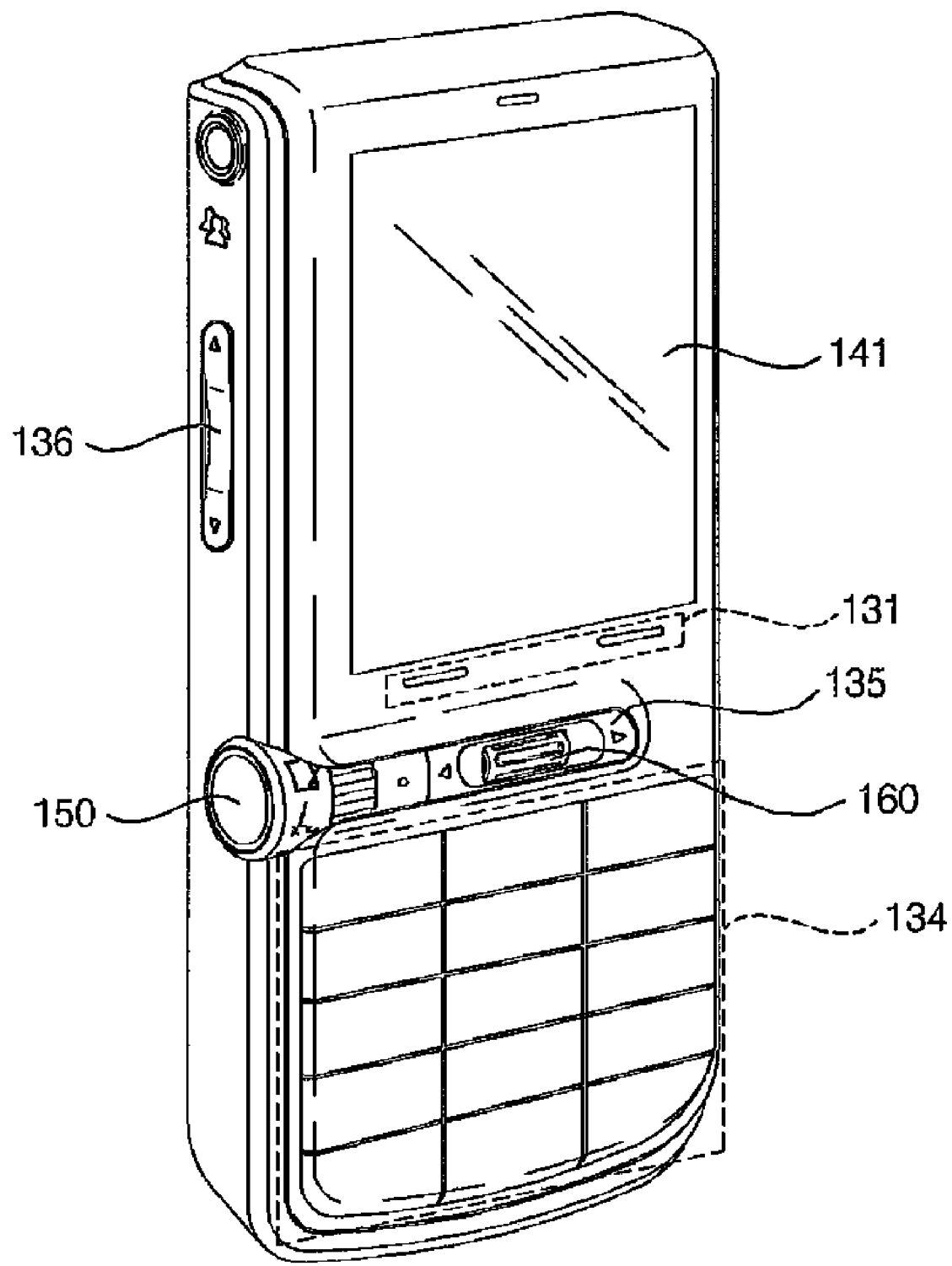

Turning first to FIGS. 1 and 2, which are overviews illustrating a mobile communication terminal 100 according to an embodiment of the present invention. As shown, the terminal 100 includes a display window 141 (e.g., a Liquid Crystal Display (LCD)), left and right function keys 131, a button key 134 (e.g., a call key, a call end key and a number key) and a navigation key 135. The terminal 100 also includes a volume key 136 for controlling the volume level of the terminal 100 and a camera hot key 137 for operating a camera function of the terminal 100.

Further, the terminal 100 also includes a first rotary key 150 and a second rotary key 160. In this embodiment, the first rotary key 150 is located near a side of the terminal 100 and the second rotary key 160 is located at the center of the navigation key 135. In addition, the first rotary keys 150 and 160 may be rotated clockwise or counter-clockwise and the second rotary key 160 may additionally be pressed to enter a command or select an item, for example. Thus, the first key 150 generates a signal corresponding to its rotation and the second rotary key 160 generates signals corresponding to its rotation and pressing features. Note that the first rotary key 150 may also be provided with a pressing function.

Figure 3:
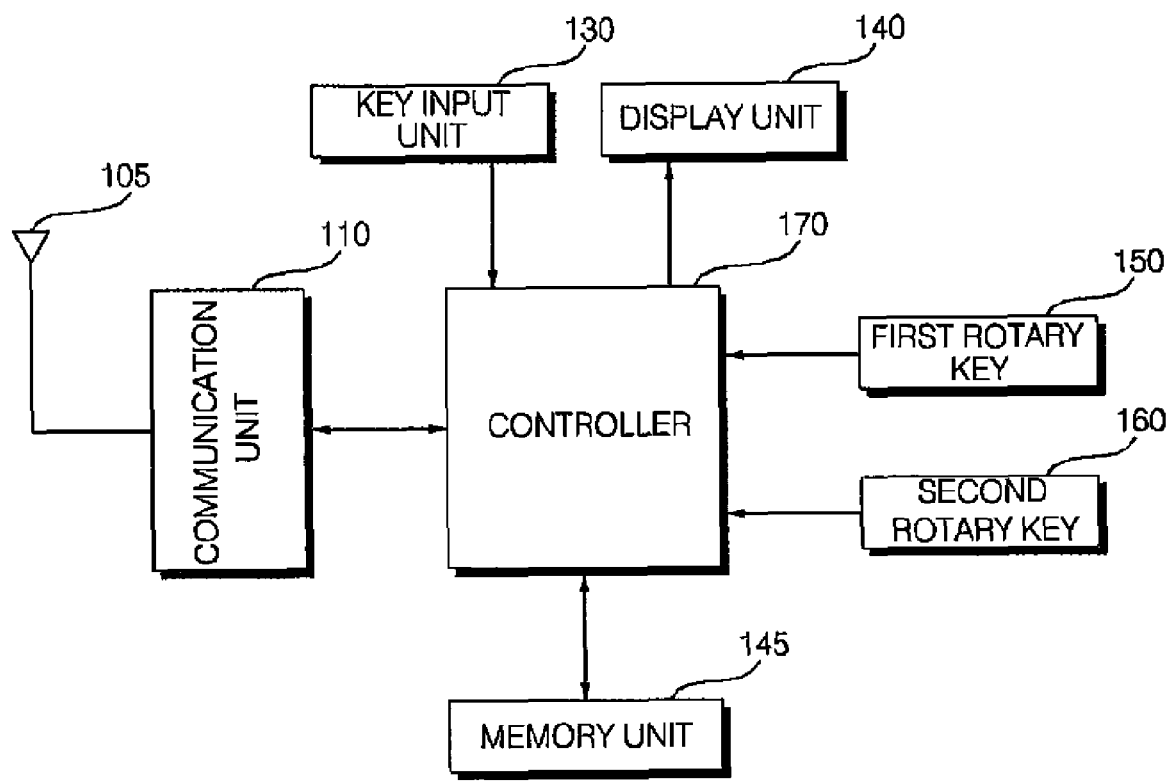
FIG. 3 is a block diagram of a mobile communication terminal according to an embodiment of the present invention.

Next, FIG. 3 is a block diagram of the mobile terminal 100 shown in FIGS. 1 and 2. As shown, the mobile terminal 100 includes an antenna 105, a communication unit 110, a key input unit 130, a display unit 140, a memory unit 145, the first rotary key 150, the second rotary key 160 and a controller 170. The communication unit 110 provides an interface for wireless communication with a base station through the antenna 105.

Further, the communication unit 110 includes a duplex filter for filtering a signal received through the antenna 105, a power amplifier for amplifying a transmit signal, a frequency up-convert circuit in a transmission path, a frequency down-convert circuit in a reception path, etc. that are used for communicating with the base station and other terminals. In addition, the key input unit 130 includes a plurality of keys such as a number key and a function key. The key input unit 130 also receives input from a user and transfers a signal corresponding to a key pressed by a user to the controller 170.

The display unit 140 includes an LCD display window, etc., and displays different menus for controlling the mobile terminal, information indicating a status of a received call, battery information, information about the operating status of the terminal, etc. Also, the memory unit 145 stores programs or data used to operate the mobile terminal, and other data entered or used by the user.

Figure 4:
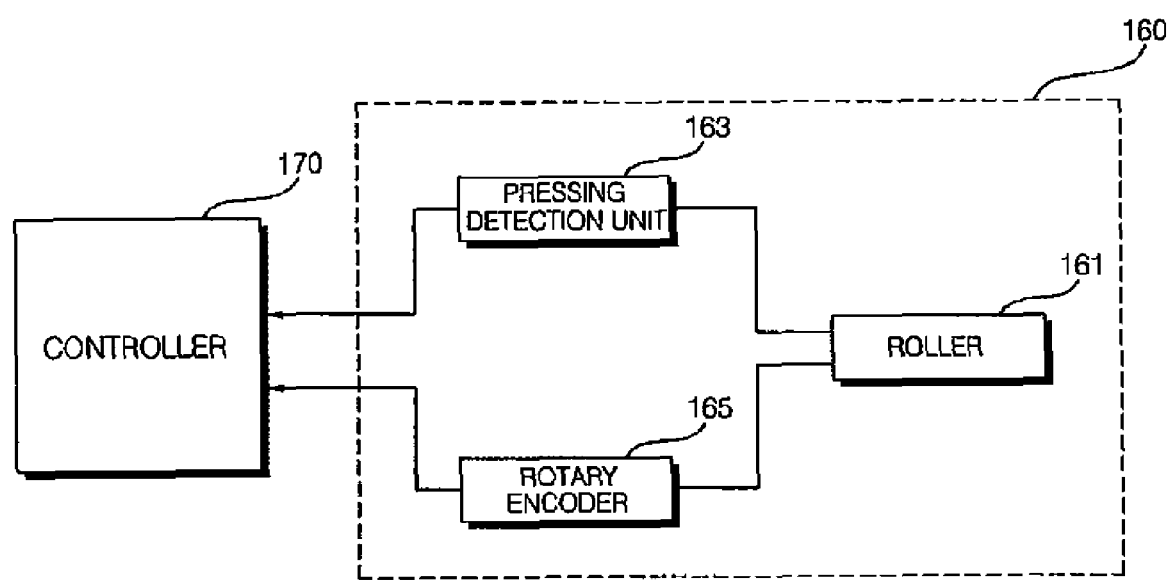
FIG. 4 is a block diagram of a second rotary key shown in FIG. 3.

Further, as discussed above, the second rotary key 160 can be pressed in addition to rotated to perform different operations on the mobile terminal. Thus, as shown in FIG. 4, the second rotary key 160 includes a pressing detection unit 163 for when the rotary key 160 is pressed, and a rotary encoder 165 for detecting when the rotary key 160 is rotated. The second rotary key 160 also includes a roller 161 that can be rotated up and down (i.e., clockwise and counter clockwise). The first rotary key 150 similarly includes a rotary encoder for determining how much and in what direction the key is rotated. The signals corresponding to the pressing/rotating of the first and second rotary keys 150 and 160 are then transmitted to the controller 170.

Further, the controller 170 uses these signal to control an operation of the mobile terminal. In particular, the controller 170 performs a variety of screen controls using a combination of signals received from the first and second rotary keys 150 and 160. The controller 170 also controls the operation of each element of the mobile terminal, as well as the overall operation of the terminal.

Figure 5:
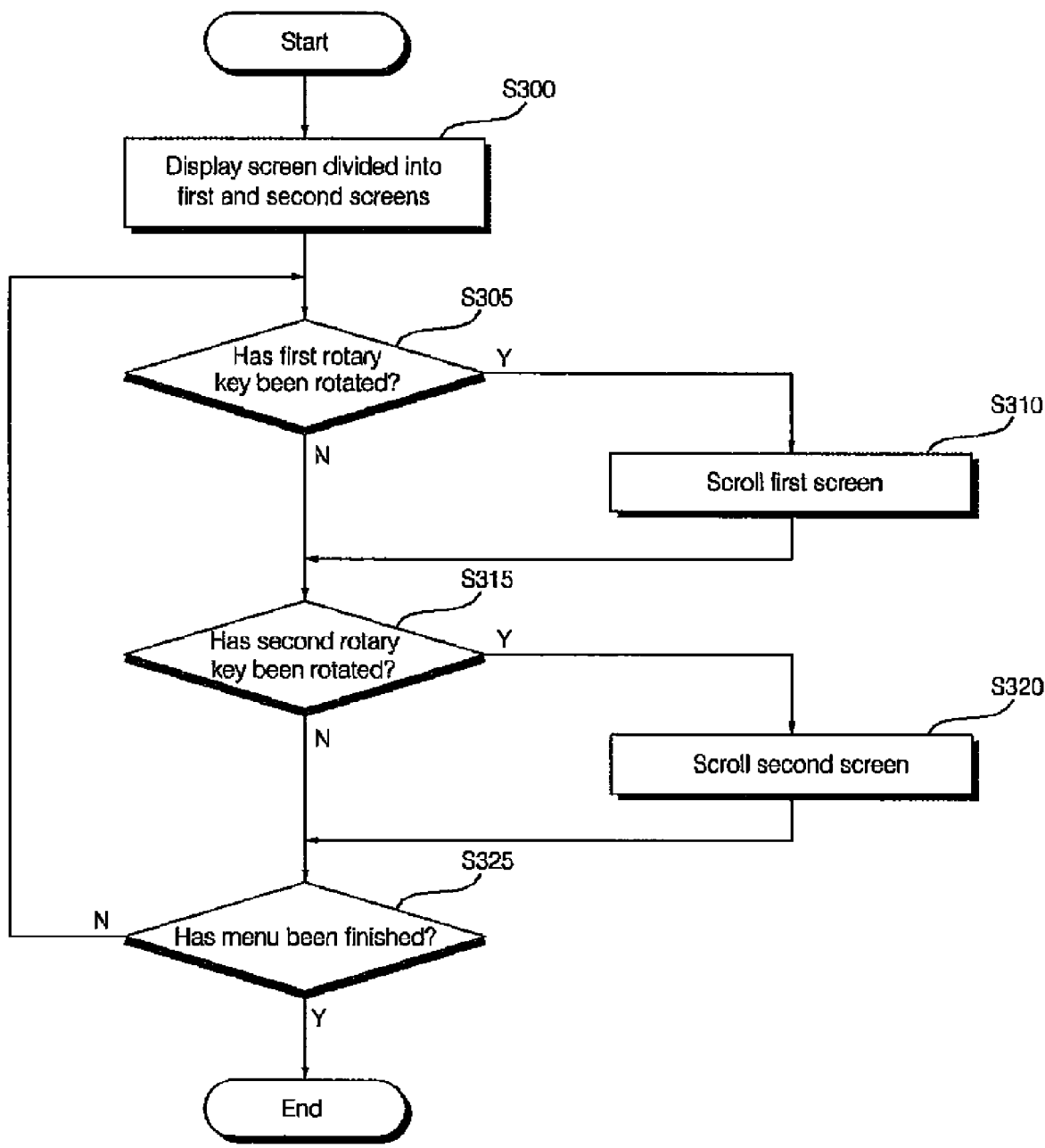
FIG. 5 is a flowchart illustrating a method of controlling a mobile communication terminal according to a first embodiment of the present invention.

Turning next to FIG. 5, which is a flowchart illustrating a method of controlling the operation of a mobile terminal according to a first embodiment of the present invention. As shown, the user first divides the display screen into at least two separate display screens (S300) (see FIG. 6(a), for example). The user can divide the display screen into other display screens by selecting a predetermined button a number of times. For example, if the user wants to display two screens, the user can repeatedly select the predetermined button twice.

Thus, in one example, the user can display two screens by pressing the second rotary key 160 twice in a successive manner. In another example, the user may display one screen by selecting (rotating) the first rotary key 150 and display two screens by selecting (pressing or rotating) the second rotary key 160. The user may also display two screens by rotating one of the first and second rotary keys in a clockwise and counter clockwise direction in a successive manner. Therefore, the user can conveniently use his or her thumb to display two screens.

Then, when the user has split the display screen into two screens (or more than two screens), the method determines if the first rotary key 150 has been rotated (S305). If the first rotary key 150 has been rotated (Yes in S305), the controller 170 scrolls through the first displayed screen in an upward or downward direction depending on the direction the first rotary key 150 is rotated. The method also determines if the second rotary key 160 has been rotated (S315), and if so (Yes in S315), the controller 170 scrolls through the second displayed screen in an upward or downward direction depending on the direction the second rotary key 160 is rotated. The method may also determine if the second rotary key 160 is rotated before determining if the first rotary key 150 is rotated (FIG. 5 illustrates the method determining if the first rotary key 150 is rotated before determining if the second rotary key 160 is rotated). The above process is repeated until the user closes or exits the options displayed in the two display screens (S325).

Note that if more than two display screens are displayed, the controller 170 can be configured to determine which screen to scroll through using a combination of the signals generated by the first and second rotary keys 150 and 160. For example, the controller 170 can scroll through first and second display screens when the first and second rotary keys 150 and 160 are rotated (as discussed above), and rotate through a third display screen when the second rotary key 160 is pressed three times in successive order to indicate the third display screen is to be scrolled through. Other variations are also possible.

Figure 6:
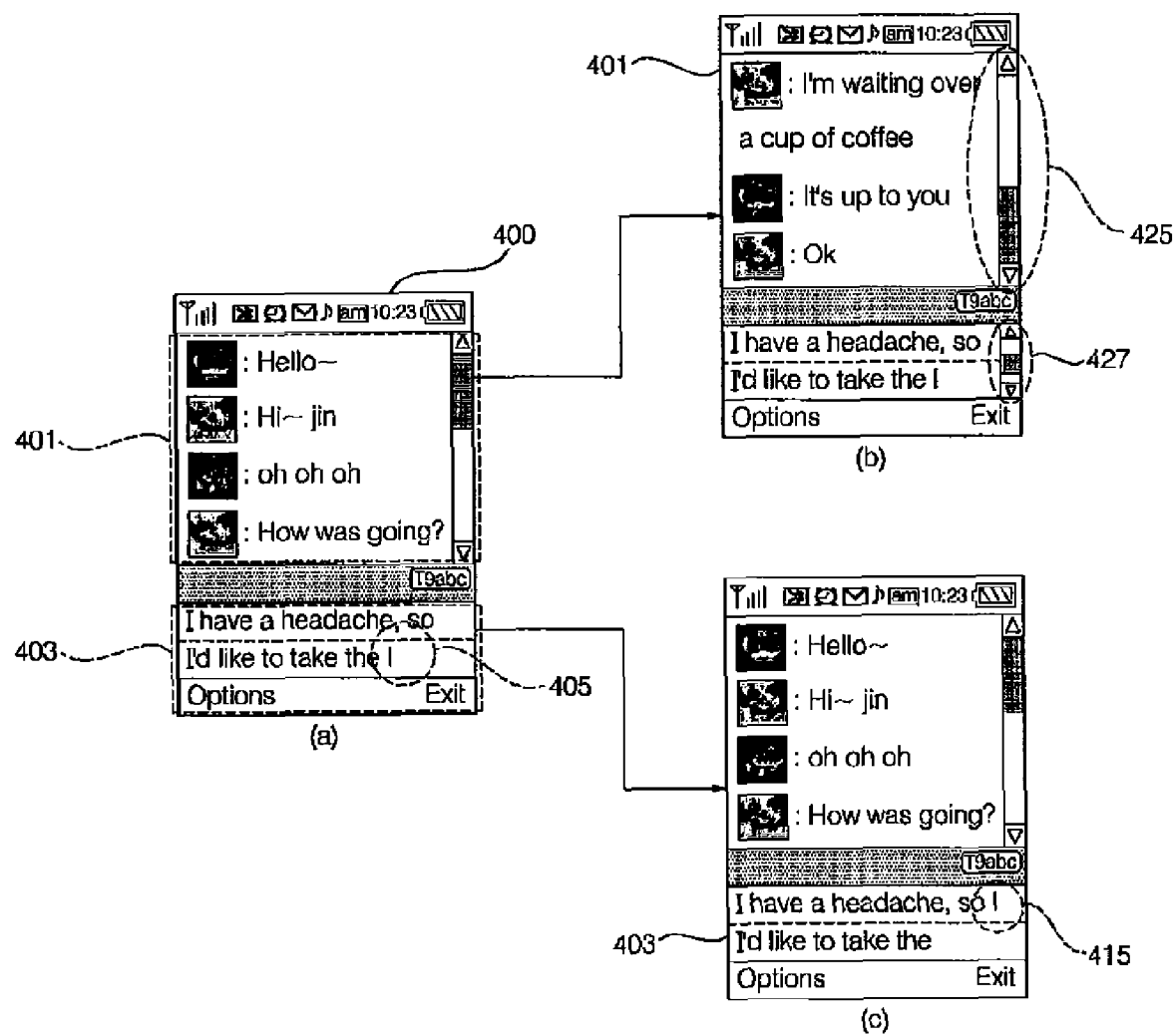
FIGS. 6(a)-(c) are overviews illustrating display screens shown when controlling the operation of the mobile communication terminal according to the first embodiment of the present invention.

The method described above with respect to FIG. 5 will now be described with example display screens shown in FIGS. 6(a)-(c). In more detail, FIG. 6(a) illustrates a display screen 400 being divided into a first display screen 401 and a second display screen 403. As shown, the first display screen 401 includes a plurality of icons representing people that are in a chat room, for example. The second display screen 403 includes messages that are input by the different people in the chat room.

Next, FIG. 6(b) illustrates a user scrolling through the first display screen 401 by rotating the first rotary key 150. Similarly, FIG. 6(c) illustrates a user scrolling through the second display screen 403 by rotating the second rotary key 160. Further, the first and second display screens also include scroll bars 425 and 427 to indicate to the user how much they have scrolled through the particular display screen. For example, as shown in FIG. 6(b), the scroll bar 425 indicates the user is at a bottom of the display screen 401. In addition, horizontal scroll bars may also be used. Also, the items may be highlighted as they are scrolled through to indicate where the user is in each respective window.

Further, as shown in FIGS. 6(a) and 6(c), the user scrolls through the second display screen 403 from a position 405 to a position 415 using the scroll bar 427 (shown only in FIG. 6(b)).

Figure 7:
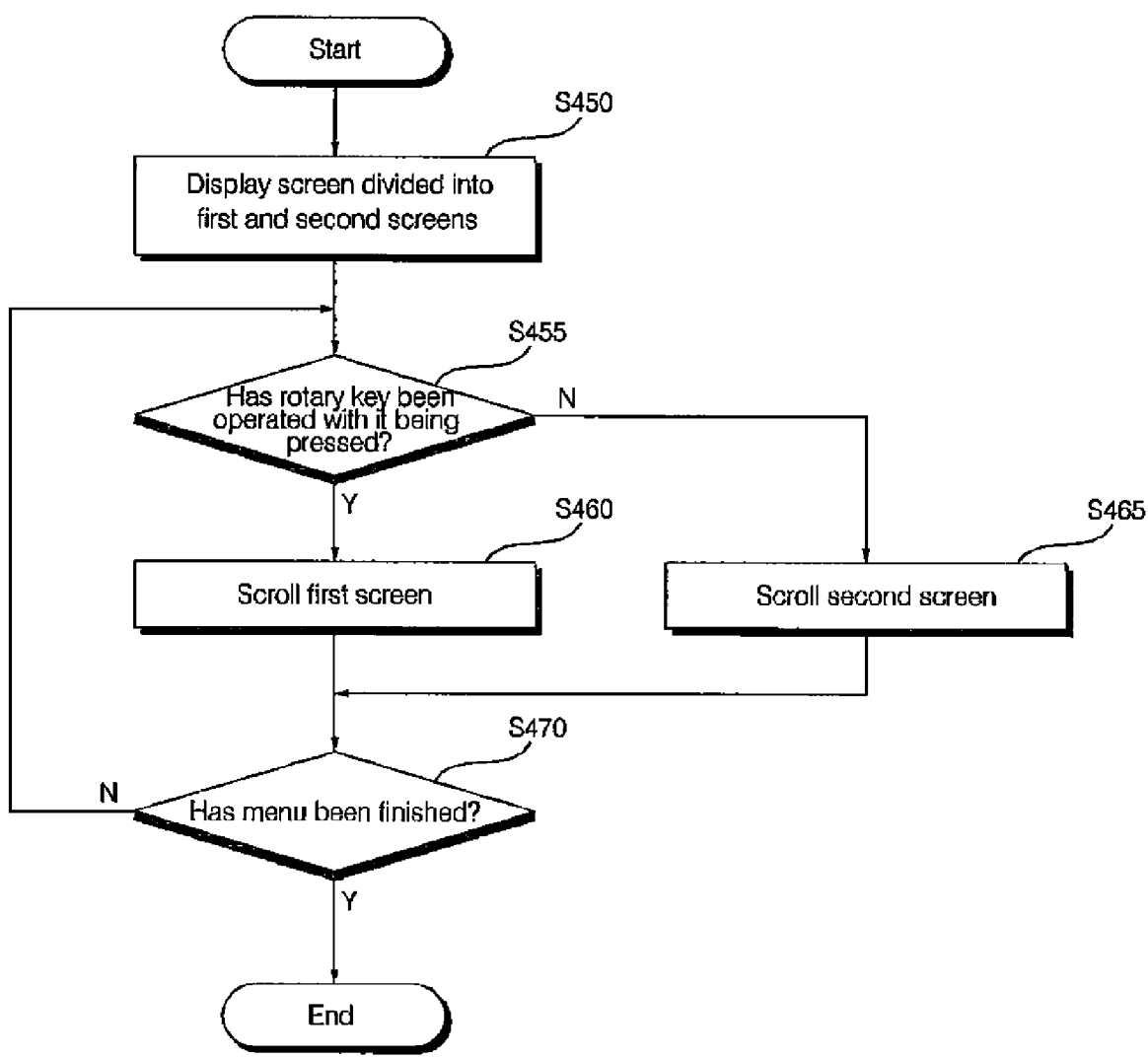
FIG. 7 is a flowchart illustrating a method of controlling a mobile t communication terminal according to a second embodiment of the present invention.

Next, FIG. 7 is a flowchart illustrating a method of controlling the operation of a mobile communication terminal according to a second embodiment of the present invention.

In this embodiment, the user can scroll through the first and second display screens using only the second rotary key 160. In more detail, the user first divides the original screen into first and second display screens 401 and 403 (as shown in FIG. 6(a)) (S450). Then, the method determines if the user is only rotating the second rotary key 160 or rotating and pressing the second rotary key 160 (S455).

If the user is only rotating the second rotary key 160 (No in S455), the controller 170 scrolls the second display screen 403 (as shown in FIG. 6(c)). However, if the user is pressing and rotating the second rotary key 160 (Yes in S455), the controller 170 scrolls through the first display screen 401 (as shown in FIG. 6(b)). The above process is repeated until the user closes or exits the options displayed in the two display screens (S470).

In addition, in an alternative embodiment, the first display screen 401 may be scrolled through if the user is only rotating the second rotary key 160 and the second display screen 403 may be scrolled through if the user is both rotating and pressing the second rotary key 160 (i.e., opposite to the method shown in FIG. 7). In addition, the first rotary key 150 may also be provided with a pressing detecting unit and then used to scroll through the two display screens rather than using the second rotary key 160. Thus, in accordance with an embodiment of the present invention, the user can easily scroll through different display screens using a single rotary key.

Figure 8:
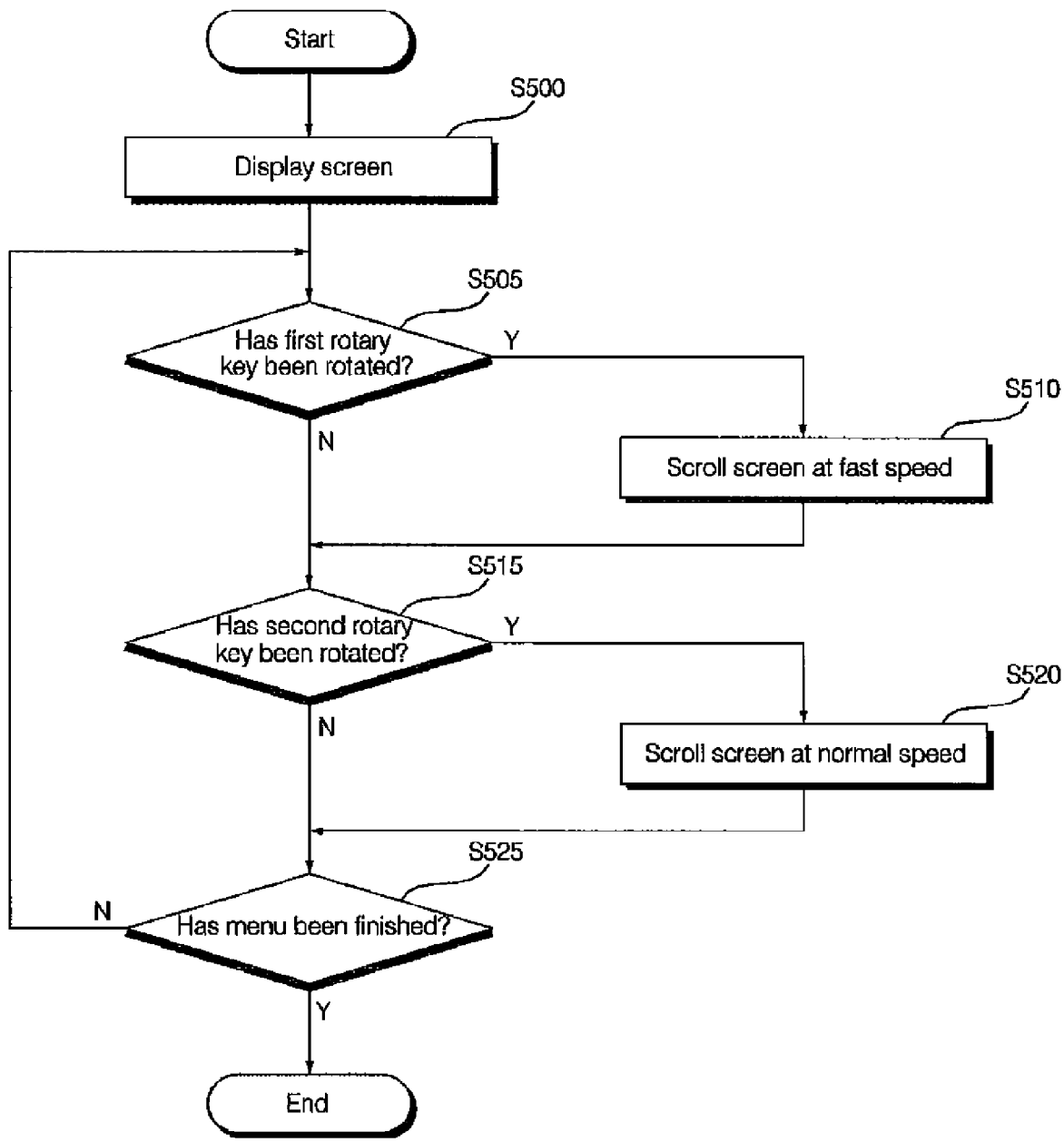
FIG. 8 is a flowchart illustrating a method of controlling a mobile communication terminal according to a third embodiment of the present invention.

Turning next to FIG. 8, which is a flowchart illustrating a method of controlling the operation of a mobile terminal according to a third embodiment of the present invention. As shown, the user selects a specific menu through the key input unit 130 and the controller 170 displays a corresponding screen on the display unit 140 (S500). The method then determines if the first rotary key 150 has been rotated (S505). If the user has rotated the first rotary key 150 (Yes in S505), the controller 170 scrolls through the displayed screen at a fast speed.

The method also determines if the user has rotated the second rotary key 160 (S515). If the user has rotated the second rotary key 160 (Yes in S515), the controller 170 scrolls through the displayed screen at a normal speed. Note, the fast speed is faster than the normal speed. This process is repeatedly performed until the selected menu is completed (S525).

Figure 9:
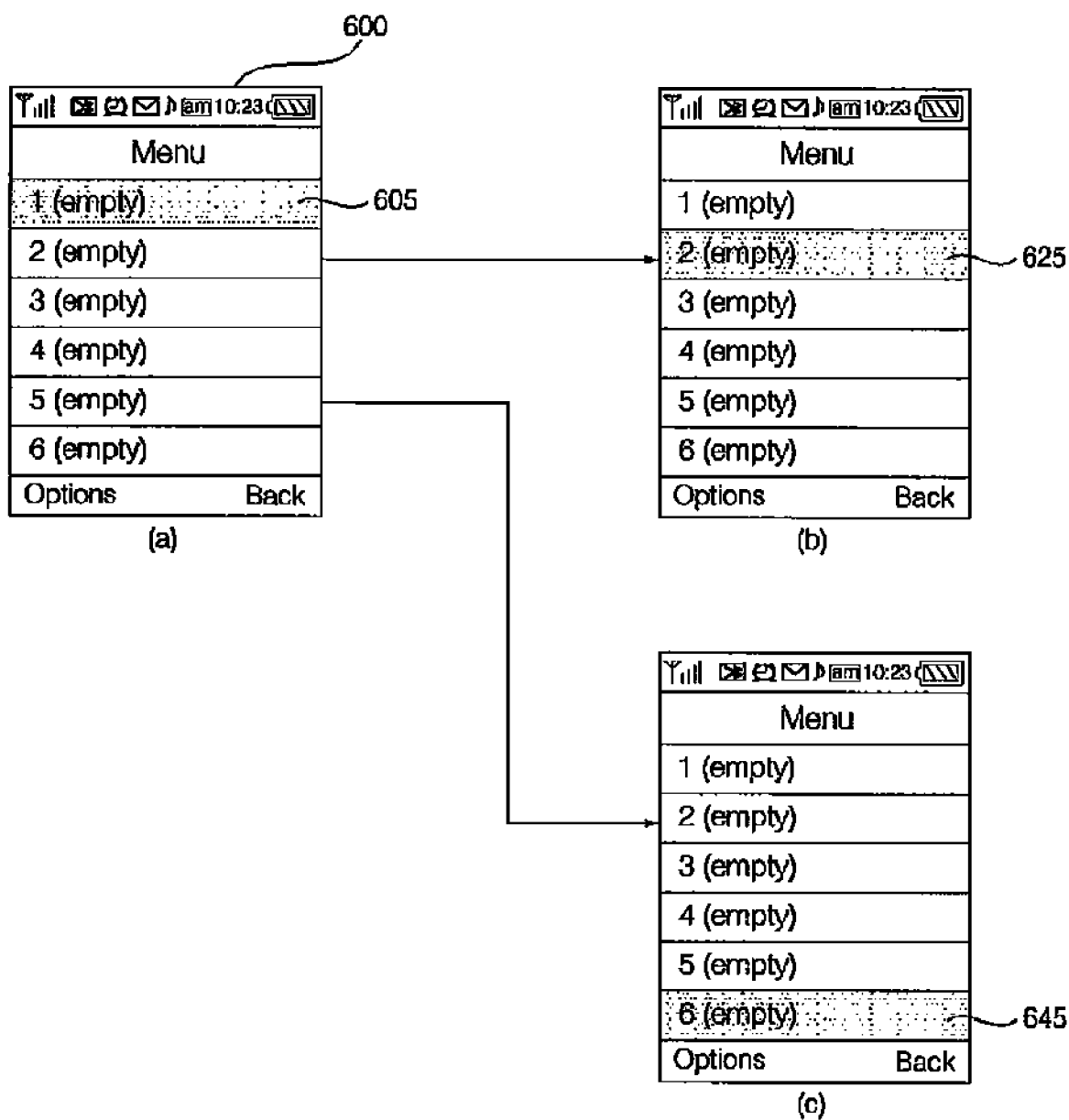
FIGS. 9(a)-(c) are overviews illustrating display screens shown when controlling the operation of a mobile communication terminal according to the third embodiment of the present invention.

Next, the method discussed with respect to FIG. 8 will be described with reference to the display screens shown in FIGS. 9(a)-(c). In more detail, FIG. 9(a) illustrates a displayed specific list screen 600. The reference numeral 605 indicates an item that is currently highlighted. Thus, when the user rotates the second rotary key 160, the items included in the displayed screen 600 are scrolled through at a normal speed as shown in FIG. 6(b). Note that reference numeral 625 indicates a next currently highlighted item that was scrolled to at a normal speed (e.g., item by item).

In addition, when the user rotates the first rotary key 150, the controller 170 rotates through the displayed items at faster speed as shown in FIG. 6(c). The reference numeral 645 in FIG. 6(c) indicates a highlighted item that was quickly scrolled to. Further, the normal and faster scrolling speeds can be preset by a manufacturer of the terminal and adjusted by a user using the appropriate menu options.

Figure 10:
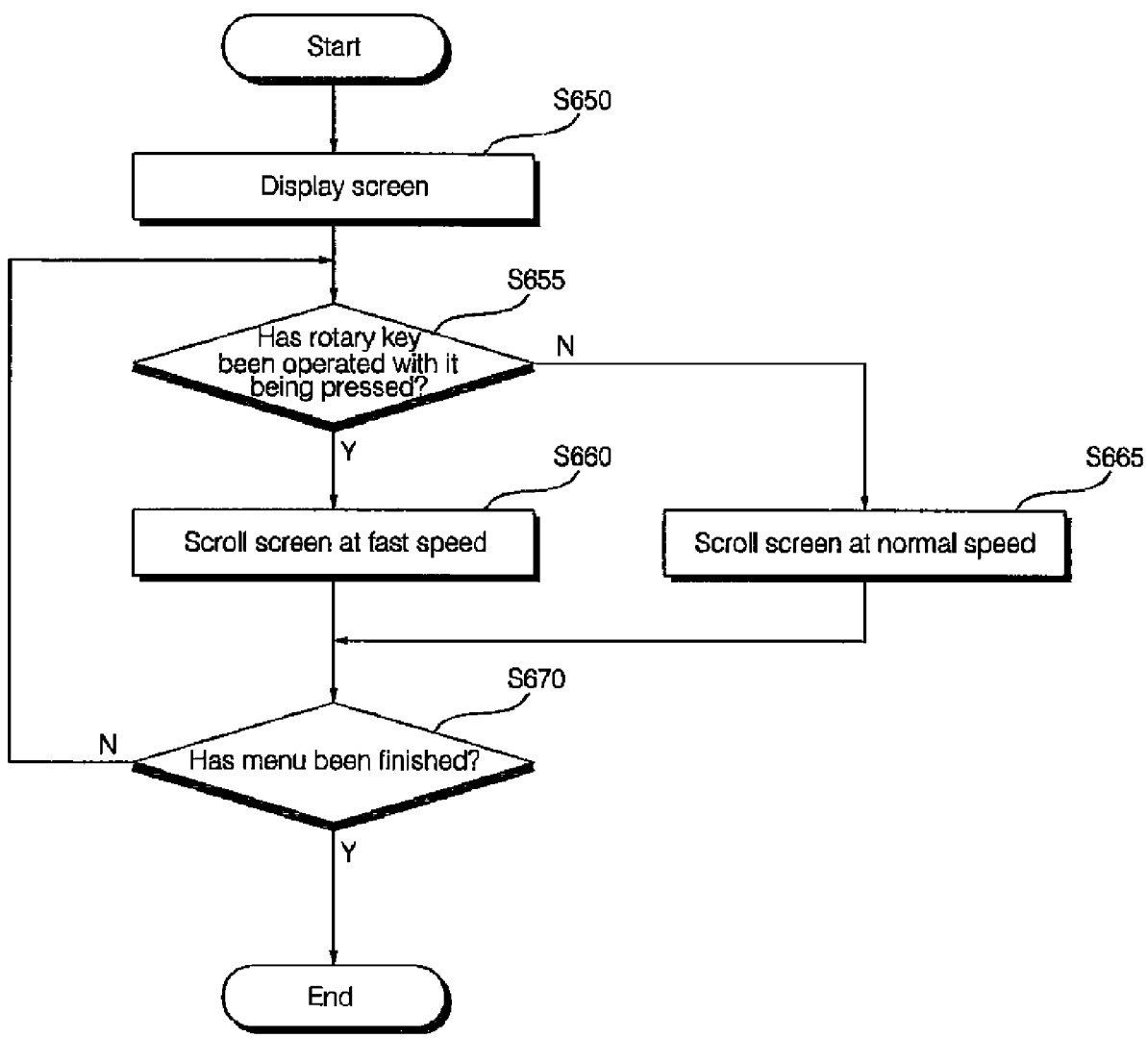
FIG. 10 is a flowchart illustrating a method of controlling the operation of a mobile communication terminal according to a fourth embodiment of the present invention.

Next, FIG. 10 is a flowchart illustrating a method of controlling the operation of a mobile terminal according to a fourth embodiment of the present invention. As shown, when a user selects a specific menu through the key input unit 130, the controller 170 displays a corresponding screen on the display unit 140 (S650). Then, the method determines if the user presses and rotates the second rotary key 160 (S655). If the user only rotates (and doesn't press) the second rotary key 160 (No in S655), the controller 170 scrolls through the items in the displayed screen at a normal speed (S655). Further, if the user presses and rotates the second rotary key 160 (Yes in S655), the controller 170 scrolls through the items in the displayed screen at a faster speed (S660). This process is repeatedly performed until the selected menu is completed (S670).

The method in FIG. 10 can also be described with reference to the displayed screens shown in FIGS. 9(a)-(c). That is, FIG. 9(a) illustrates the displayed screen corresponding to the selected specific menu, FIG. 9(b) illustrates scrolling through items at a normal speed, and FIG. 9(c) illustrates scrolling through the items at a faster speed. Further, in an alternative embodiment, the speed at which the screen is scrolled can be controlled to be faster in proportion to how long the second rotary key 160 is pressed. In order words, if the second rotary key 160 is rotated while being pressed, the screen is scrolled faster and faster based on a length of time the second rotary key 160 is pressed. Furthermore, the same function can be implemented using the first rotary key 150 (if the first rotary key 150 also includes an appropriate pressing detection unit).

Figure 11:
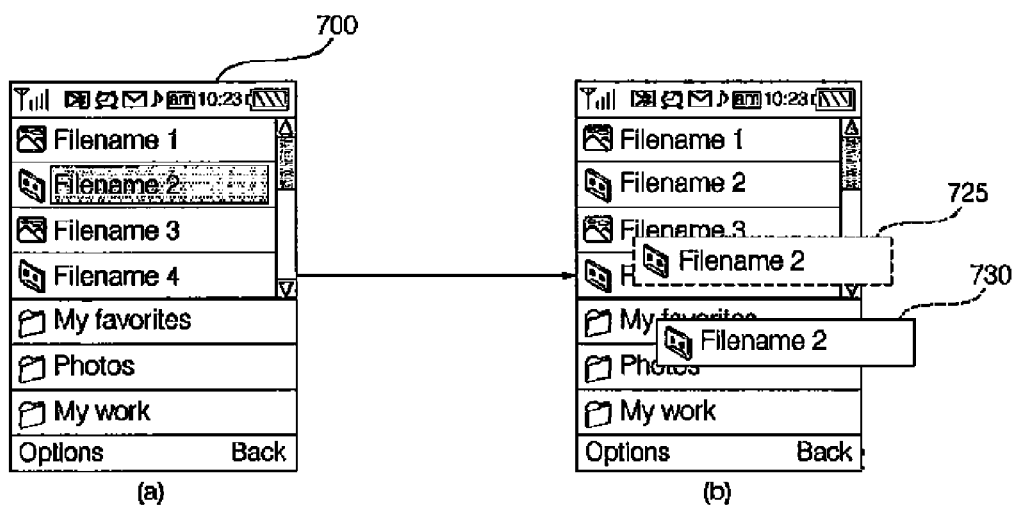
FIG. 11 is a flowchart illustrating a method of controlling the operation of a mobile communication terminal according to a fifth embodiment of the present invention.

Next, FIGS. 11(a) and (b) are overviews illustrating display screens for illustrating a method of controlling the operation of a mobile terminal according to a fifth embodiment of the present invention. This embodiment illustrates a situation where a drag & drop function is provided using the first and second rotary keys 150 and 160.

In more detail, FIG. 11(a) illustrates a display screen 700 of a main menu including a plurality of files and folders. The user may scroll through the items in display screen 700 by rotating, for example, the second rotary key 160. Then, the highlighted item (i.e., filename 2 in FIG. 11(a)) can be selected by highlighting the item for a period of time that is longer than a predetermined amount of time or by pressing the second rotary key 160. Then, the user may rotate the first rotary key 150 to scroll through the items in the display screen 700 to reach an item that he or she wants to drag and drop the selected item into. The item may be dropped into the selected folder or location by staying at the location for a predetermined amount of time or by pressing the second rotary key 160.

For example, FIG. 11(b) illustrates the filename 2 (designated as reference numeral 725) being selected and dragged to the Photos folder (designated as reference numeral 730). The user may then highlight the Photos folder and drop the filename 2 into the Photos folder by again pressing the second rotary key 160. Furthermore, the drag & drop function can also be provided using only the second rotary key 160. For instance, if any one file is selected by pressing the rotary key 160 in the menu 700, and the rotary key 160 is rotated while being pressed, the selected file 725 can be moved in a drag & drop manner to a desired folder or location.

Figure 12:
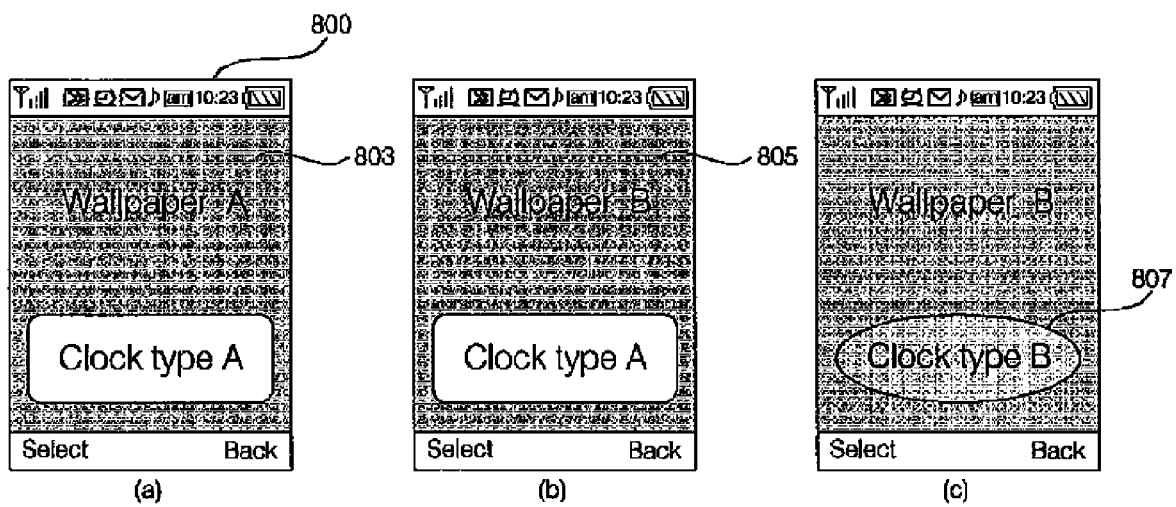
FIG. 12 is a flowchart illustrating a method of controlling the operation of a mobile communication terminal according to a sixth embodiment of the present invention.

Turning next to FIGS. 12(a)-(c), which are overviews illustrating a method of controlling the operation of a mobile communication terminal according to a sixth embodiment of the present invention. The present embodiment illustrates a situation where the display setting of items are changed based on the first and second rotary keys 150 and 160. In more detail, FIG. 12(a) illustrates a screen 800 having a wallpaper background 803. In this instance, the wallpaper background 803 is changed to a wallpaper background 805 (see FIG. 12(b)) when the user rotates the second rotary key 160. Furthermore, FIG. 12(c) illustrates the display state of a specific item 807 being changed by rotating the first rotary key 150. As described above, the first and second rotary keys 150 and 160 can be used to change the display state of different items.

Thus, the first and second rotary keys 150 and 160 can be used to easily scroll through particular screens at desired speeds and to drag and drop items shown on the display. Therefore, the present invention significantly improves the user's convenience. In addition, because the terminal can be controlled with a single rotary key or with two rotary keys, the keys on a mobile terminal can be disposed in a limited space more efficiently, which results in further improving the user's convenience.

Figure 13:
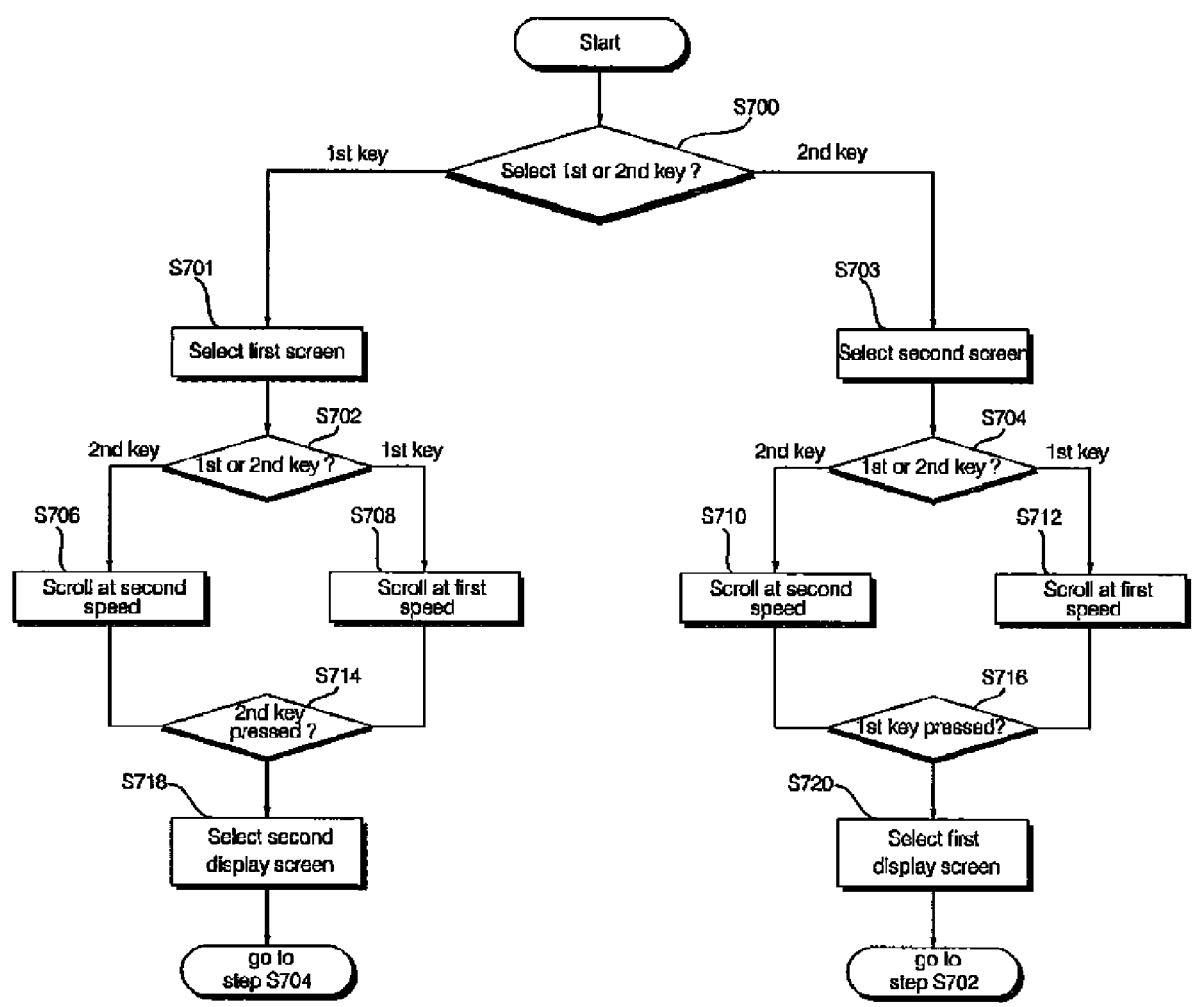
FIG. 13 is a flowchart illustrating a method of controlling the operation of a mobile communication terminal according to a seventh embodiment of the present invention.

Next, FIG. 13 is a flowchart illustrating a method of controlling the operation of a mobile communication terminal according to a seventh embodiment of the present invention. In this embodiment, the user can toggle between divided first and second display screens and scroll through each respective screen at different scrolling speeds. In more detail, when two display screens are provided, the method determines whether the user selects the first or second rotary keys 150 and 160 (S700). The user can select the rotary keys by rotating or pressing the keys. Further, this embodiment assumes the both of the first and second rotary keys 150 and 160 can be pressed and rotated.

If the user selects the first rotary key 150, the first display screen is selected (highlighted) (S701). Similarly, if the user selects the second rotary key 160, the second display screen is selected (S703). Thus, the user can toggle between the first and second display screens. Then, if the first display screen has been selected in step S701, the method determines if the first rotary key 150 or second rotary key 160 is rotated (S702). If the first rotary key 150 is rotated, the selected first display screen is scrolled through at a first scroll speed (S708). Also, if the second rotary key 160 is rotated, the selected first display screen is scrolled through at a second scroll speed (S706). In addition, if the user then presses the second rotary key 160 while the first display screen is selected (highlighted) (S714), the second display screen is selected (S718) and the method goes to step S704.

In addition, if the second key is selected (highlighted) in step S700, the second display screen is selected (highlighted) (S703), and the method determines if the first rotary key 150 or second rotary key 160 is rotated (S704). If the first rotary key 160 is rotated, the selected second display screen is scrolled through at a first scroll speed (S712). Also, if the second rotary key 150 is rotated, the selected second display screen is scrolled through at a second scroll speed (S710). In addition, if the user then presses the first rotary key 150 while the first display screen is selected (highlighted) (S716), the first display screen is selected (S720) and the method goes to step S702.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
   a first rotary key configured to generate a first signal when the first rotary key is rotated, said first signal indicating a direction and an amount the first rotary key is rotated;
   a second rotary key configured to generate a second signal when the second rotary key is rotated, said second signal indicating a direction and an amount the second rotary key is rotated;
   a display unit configured to display a screen thereon; and
   a controller configured to control a specific operation on the displayed screen based on the first and second signals,
   wherein the first rotary key is further configured to generate a third signal when pressed and the second rotary key is further configured to generate a fourth signal when pressed,
   wherein the controller is further configured to divide the screen displayed on the display unit into first and second screens, and to select the first display screen when the first rotary key is pressed or rotated and selects the second display screen when the second rotary key is pressed or rotated,
   wherein when the first display screen is selected, the controller is further configured to scroll through the selected first display screen at a first speed based on the first generated signal from the first rotary key, to scroll through the first display screen at a second speed based on the second generated signal from the second rotary key, and to toggle to select the second display screen when the fourth signal from the second rotary key is generated, and
   wherein when the second display screen is selected, the controller is further configured to scroll through the selected second display screen at the first speed based on the first generated signal from the first rotary key, to scroll through the second display screen at the second speed based on the second generated signal from the second rotary key, and to toggle to select the first display screen when the third signal from the first rotary key is selected.

2. The mobile terminal of claim 1, wherein the first speed is faster than the second speed.

3. The mobile terminal of claim 1, wherein the controller is further configured to scroll through the screen displayed on the display unit based on the first generated signal, and to drag and drop a selected item on the displayed screen to another location or folder based on the second generated signal.

4. The mobile terminal of claim 1, wherein the controller is further configured to control a display form of a first item displayed on the screen to be changed according to another generated first signal, and to control a display form of a second item displayed on the screen to be changed according to said another generated second signal.

5. A method for controlling a mobile communication terminal, the method comprising:
   generating a first signal when a first rotary key on the terminal is rotated, said first signal indicating a direction and an amount the first rotary key is rotated;
   generating a second signal when a second rotary key on the terminal is rotated, said second signal indicating a direction and an amount the second rotary key is rotated;
   displaying a screen on the terminal; and
   controlling a specific operation on the displayed screen based on the first and second signals,
   wherein the first rotary key is further configured to generate a third signal when pressed and the second rotary key is further configured to generate a fourth signal when pressed,
   wherein the controlling step divides the displayed screen into first and second screens, and selects the first display screen when the first rotary key is pressed or rotated and selects the second display screen when the second rotary key is pressed or rotated,
   wherein when the first display screen is selected, the controlling step scrolls through the selected first display screen at a first speed based on the first generated signal from the first rotary key, scrolls through the first display screen at a second speed based on the second generated signal from the second rotary key, and toggles to select the second display screen when the fourth signal from the second rotary key is generated, and wherein when the second display screen is selected, the controlling step scrolls through the selected second display screen at the first speed based on the first generated signal from the first rotary key, scrolls through the second display screen at the second speed based on the second generated signal from the second rotary key, and toggles to select the first display screen when the third signal from the first rotary key is selected.

6. The method of claim 5, wherein the first speed is faster than the second speed.

7. The method of claim 5, wherein the controlling step scrolls through the displayed screen based on the first generated signal, and drags and drops a selected item on the displayed screen to another location or folder based on the second generated signal.

8. The method of claim 5, wherein the controlling step controls a display form of a first item on the displayed screen to be changed according to another generated first signal, and controls a display form of a second item on the displayed screen to be changed according to another generated second signal.

* * * * *